April 21, 1931.  A. J. F. DE BAVAY  1,801,727
AIRCRAFT
Filed Sept. 7, 1929
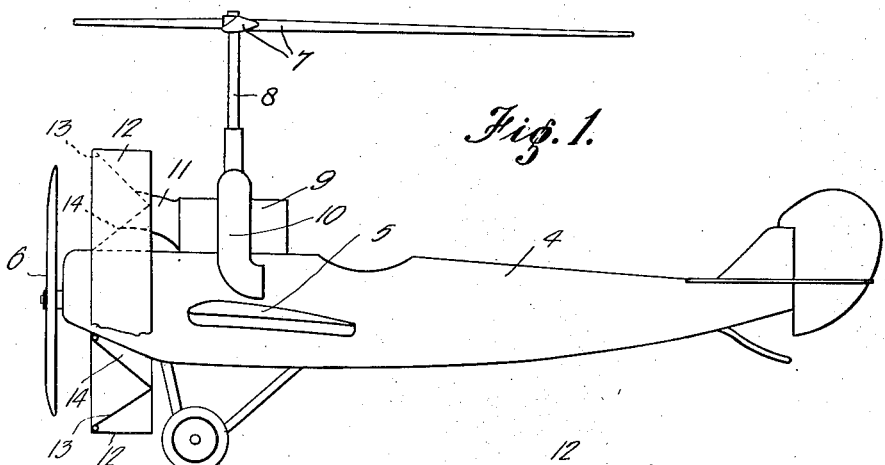
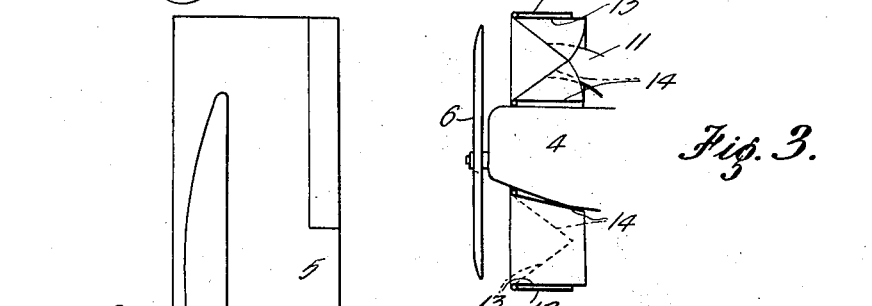
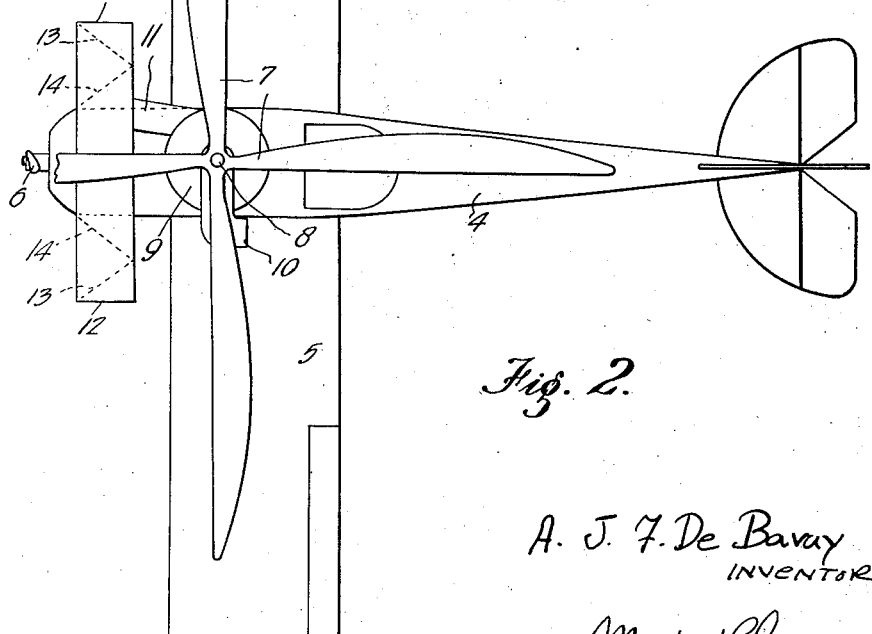
A. J. F. De Bavay
INVENTOR Patented Apr. 21, 1931

1,801,727

UNITED STATES PATENT OFFICE

AUGUSTE JOSEPH FRANCOIS DE BAVAY, OF KEW, AUSTRALIA

AIRCRAFT

Application filed September 7, 1929, Serial No. 390,968, and in Australia September 24, 1928.

This invention relates to improvements in aircraft and refers especially to aircraft of the heavier-than-air type.

Aircraft of this type at present in general use are sustained in flight by the pressure of the air on fixed inclined wings which are moved rapidly therethrough by means of one or more propelling airscrews rotating in substantially vertical planes.

Consequently, these machines cannot take-off or land in a restricted space as the minimum horizontal velocity necessary to sustain the machine in flight is relatively high.

Now, the object of the present invention is to provide improvements in aircraft of the above mentioned type whereby the same will not be solely dependent upon forward movement for sustentation, thus enabling such aircraft to take-off and land in more restricted areas than is at present possible.

I accomplish the above mentioned objects by utilizing the air current or slipstream created by one or more engine operated propelling airscrews to impart movement to one or more lifting airscrews or like devices.

The lifting airscrews are preferably arranged substantially horizontally and may be actuated by means of air motors or turbines and suitable deflecting means may be provided for directing the disturbed air or slipstream of the ordinary propelling means to said air motors or turbines.

Alternatively, the disturbed air from the propelling airscrew or screws may be deflected direct to the horizontal or lifting screw or screws in such a manner as to rotate the same and impart a lifting tendency to the machine.

Having set forth the general characteristics of my invention, reference will be made to the accompanying drawings which portray diagrammatically one application of the invention, and wherein:—

Figure 1 is a view in side elevation of an aeroplane fitted with an improved lifting device in accordance with the present invention;

Figure 2 is a view in plan of the machine indicated in Figure 1; and

Figure 3 is a view of portion of the machine shown in Figure 1 and illustrates the annular baffle in an open condition.

Referring to the drawings, the reference numeral 4 designates the fuselage of a flying machine provided with wings 5 in the usual way. Whilst the drawings illustrate the invention as applied to a monoplane, it will be understood that it is not confined thereto.

A propelling airscrew 6 is arranged at the front end of the fuselage in the usual way and is adapted to be actuated by means of a power plant not indicated in the drawings.

A lifting airscrew 7 of appropriate size is arranged substantially horizontally and centrally above the fuselage 4 and is secured to the upper end of a spindle 8, rotatively mounted in bearings carried on the fuselage. The lower end of the spindle is secured to the rotor or an airmotor 9 arranged above the fuselage.

The discharge pipe 10 of the airmotor may be arranged in any approved manner whilst the intake 11 communicates with an annular collecting member or baffle carried by the body of the machine and arranged behind the propelling airscrew 6.

The annular baffle is capable of being opened and closed so that the disturbed air or slipstream from the propeller 6 is directed to the airmotor 9 only when desired, and, in the rudimentary construction illustrated, the said baffle comprises a guide cylinder 12 surrounding the fuselage and open at each end and accommodating collapsible members 13 and 14 secured at their forward ends to the fuselage and guide ring respectively, and adapted to be actuated whereby their rear ends will be moved into contact to prevent the passage of air through the cylinder. When the collapsible members 13 and 14 are opened, they preferably lie parallel with the fuselage and guide cylinder respectively, thereby permitting the free passage of air therebetween (see Figure 3).

Suitable controls, not indicated in the drawings, are provided whereby the pilot may open or close the annular baffle at will.

When the collecting device is closed as indicated in Figures 1 and 2 of the drawings, the slipstream of the propelling airscrew 6 is directed to the airmotor 9, thus rotating the lifting screw 7 which imparts a lifting tendency to the machine.

When it is desired to take-off or ascend, the machine is preferably first held stationary by means of chocks or brakes and the vertical or propelling airscrew 6 is started up after the annular baffle has been closed. In this manner the lifting airscrew 7 is rotated by means of the airmotor 9 and, when its speed of rotation or the sustaining force thereof reaches a predetermined magnitude, the chocks are removed or the brakes released and the annular baffle gradually opened, thus permitting the machine to move forwardly until the combined sustaining forces of the horizontal propeller 7 and the wings 5 exceeds the weight of the machine which then commences to rise steeply. It will be understood that, as the annular baffle is being opened, the sustaining force of the horizontal propeller is reduced so that more of the lift is taken on the ordinary wings or planes 5 until, finally, practically the whole weight of the machine is supported by the wings.

When it is desired to land, the annular baffle is closed so that the lifting airscrew is again operated by the slipstream of the propelling airscrew 6, the engine of which is running. The annular baffle increases the resistance to forward motion, so that the machine slows down whilst, at the same time, the lifting airscrew gradually takes up part of the load, thereby enabling the machine to land with a low forward speed.

It will be appreciated that the greater the share of the load taken by the lifting airscrew 7, the lower is the forward speed necessary to lift the machine.

It will be appreciated that the invention is not confined to aircraft having one vertical or propelling airscrew 6 or one horizontal or lifting airscrew 7, nor is it necessary for a propelling airscrew 6 to be provided for each lifting screw 7.

If desired, one or more propelling airscrews 6 not associated with the lifting screw or screws 7 may be provided in addition to those adapted to co-operate therewith.

When more than one lifting airscrew 7 is provided, the same should be arranged symmetrically about the longitudinal axis of the machine.

In lieu of providing an airmotor as 9 for imparting movement to the lifting screw 7, one or more baffles may be arranged to deliver the air moving rearwardly from the airscrew 6 direct to the lifting screw 7, in such a manner that the same will be actuated to impart a lifting force on the machine.

I claim:

1. An aeroplane having fixed wings, an engine operated propelling airscrew, a lifting airscrew disposed in a plane substantially at right angles to the propelling airscrew, means for utilizing the slipstream from the propelling airscrew to actuate the lifting airscrew, and adjustable means adapted to be actuated when desired to direct the said slipstream to said utilizing means.

2. An aeroplane having engine operated propelling means, a lifting airscrew, means for utilizing the slipstream from the propelling means for actuating the lifting airscrew, and adjustable means adapted to be actuated to direct said slipstream to said utilizing means when desired, characterized in that the aeroplane may be sustained in flight independently of the actuation of the lifting airscrew by the said slipstream.

3. In an aeroplane, engine operated propelling means, lifting airscrews, means for utilizing the slipstream from the propelling means for actuating the lifting airscrews, adjustable collecting means arranged behind the propelling means and associated with the utilizing means, and means for adjusting the said collecting means whereby the slipstream may be directed to the utilizing means or diverted therefrom as desired, characterized in that the aeroplane may be sustained in flight independently of the actuation of the lifting airscrews by the said slipstream.

4. An aeroplane having fixed wings, an engine operated propelling airscrew, a rotatable lifting airscrew disposed in a plane substantially at right angles to the propelling airscrew, an air-motor adapted to actuate the lifting airscrew, and adjustable means adapted to be actuated when desired to direct the slipstream from the propelling airscrew to the air-motor, and characterized in that the aeroplane may be sustained in flight independently of the actuation of the lifting airscrew by the said air-motor.

5. An aeroplane according to claim 4 wherein the adjustable means comprises an annular collecting member arranged behind the propelling airscrew and associated with the air-motor.

6. In an aeroplane according to claim 4, an annular collecting member at the rear of the propelling airscrew and comprising a guide ring disposed concentrically with the said propelling airscrew, collapsible members arranged within the guide ring and means for opening and closing said collapsible members, whereby the slipstream will pass freely through the guide ring or be directed to the said air-motor.

7. An aeroplane according to claim 4 adapted to be supported in normal flight by the fixed wings independently of the actuation of the lifting airscrew by the said slipstream.

In witness whereof I hereunto affix my signature.

AUGUSTE JOSEPH FRANCOIS de BAVAY.